US 7,075,900 B2

(12) United States Patent
Peters

(10) Patent No.: US 7,075,900 B2
(45) Date of Patent: Jul. 11, 2006

(54) SOFTWARE BASED SINGLE AGENT MULTIPOINT CONFERENCE CAPABILITY

(75) Inventor: Michael Peters, Downers Grove, IL (US)

(73) Assignee: D.B. Zwirn Finance, LLC, New York, NY (US)

( * ) Notice: Subject to any disclaimer, the term of this patent is extended or adjusted under 35 U.S.C. 154(b) by 1003 days.

(21) Appl. No.: 09/902,205

(22) Filed: Jul. 10, 2001

(65) Prior Publication Data
US 2003/0012148 A1 Jan. 16, 2003

(51) Int. Cl.
*H04L 12/16* (2006.01)
(52) U.S. Cl. .................................... 370/260; 370/270
(58) Field of Classification Search ............... 370/260, 370/261, 262, 263, 264, 265, 266, 267, 268, 370/269, 352, 259, 353, 354, 270, 271; 709/204
See application file for complete search history.

(56) References Cited

U.S. PATENT DOCUMENTS

| | | | |
|---|---|---|---|
| 6,430,622 B1 * | 8/2002 | Aiken et al. ................. | 709/245 |
| 6,501,739 B1 * | 12/2002 | Cohen ......................... | 370/260 |
| 6,625,271 B1 * | 9/2003 | O'Malley et al. ....... | 379/202.01 |
| 6,671,262 B1 * | 12/2003 | Kung et al. ................ | 370/260 |
| 6,768,722 B1 * | 7/2004 | Katseff et al. ............. | 370/260 |
| 6,792,092 B1 * | 9/2004 | Michalewicz .............. | 370/263 |
| 6,816,469 B1 * | 11/2004 | Kung et al. ................ | 370/260 |
| 6,826,159 B1 * | 11/2004 | Shaffer et al. ............. | 370/260 |
| 6,847,618 B1 * | 1/2005 | Laursen et al. ............ | 370/261 |
| 6,853,716 B1 * | 2/2005 | Shaffer et al. .......... | 379/202.01 |
| 6,940,826 B1 * | 9/2005 | Simard et al. ............. | 370/260 |
| 2001/0053132 A1 * | 12/2001 | Attimont et al ............. | 370/260 |
| 2002/0078153 A1 * | 6/2002 | Chung et al. ............... | 709/204 |
| 2002/0141383 A1 * | 10/2002 | Schaefer et al. ............ | 370/352 |
| 2002/0176404 A1 * | 11/2002 | Girard ........................ | 370/352 |
| 2003/0002448 A1 * | 1/2003 | Laursen et al. ............. | 370/261 |
| 2003/0002486 A1 * | 1/2003 | Emerson ..................... | 370/352 |
| 2003/0012147 A1 * | 1/2003 | Buckman et al. ........... | 370/260 |
| 2003/0014488 A1 * | 1/2003 | Dalal et al. ................. | 709/204 |

FOREIGN PATENT DOCUMENTS

| | | |
|---|---|---|
| EP | 1168797 A1 | 1/2002 |
| GB | 2342806 A | 4/2000 |
| GB | 2374241 A | 10/2002 |
| WO | WO 00/41382 A1 | 7/2000 |
| WO | WO 00/57620 A1 | 9/2000 |
| WO | WO 01/86930 A2 | 11/2001 |

OTHER PUBLICATIONS

"Catalyst DSP Resources for Transcoding and Conferencing", Cisco CallManager System Guide, Chapter 21, pp. 21-1 through 21-18 (78-13341-01).
"Introduction to Cisco Conference Connection", Cisco Conference Connection Administration Guide, Chapter 1, pp. 1-1 through 1-8 (78-12957-01).

* cited by examiner

*Primary Examiner*—Phirin Sam

(57) ABSTRACT

A method and apparatus are provided for providing a three-party connection among a first, second and third call participant during a voice-over-Internet-Protocol (VoIP) telephone call. The method includes the steps of providing a respective first and second port within a transceiving terminal for receiving VoIP voice information of the VoIP telephone call from the first and second call participants, mixing the VoIP information from the ports of the first and second call participants and transferring the mixed VoIP information to the third call participant.

31 Claims, 2 Drawing Sheets

SOFTWARE BASED SINGLE AGENT MULTIPOINT CONFERENCE CAPABILITY

FIELD OF THE INVENTION

The field of the invention relates to telephony and more particularly to VoIP telephony.

BACKGROUND OF THE INVENTION

Voice over Internet Protocol (VoIP) telephony is a rapidly growing alternative to switched circuit telephony. Typically, a user purchases a VoIP software package and installs it on his personal computer (PC). To initiate a voice exchange with another party, the user enters an IP address of the other party and, if the other party has a similar software package, an exchange of voice information occurs.

Audio information is sampled by the VoIP package once every 10–30 ms. The samples are encoded into an IP packet containing an IP address of the other party. The packet is transferred over a connection to the Internet, and, ultimately, to a PC of the other party.

Within the PC of the other party, the sample is recovered and converted back into an analog signal. The analog signal is applied to a set of earphones or speaker and the other party hears the voice of the user. Voice information of the other party is transferred back to the original user under a similar process.

While VoIP telephony works relatively well, its functionality has been limited to point-to-point applications. Accordingly, a need exists for more flexible methods of using VoIP telephony.

SUMMARY

A method and apparatus are provided for providing a three-party connection among a first, second and third call participant during a voice-over-Internet-Protocol (VoIP) telephone call. The method includes the steps of providing a respective first and second port within a transceiving terminal for receiving VoIP voice information of the VoIP telephone call from the first and second call participants, mixing the VoIP information from the ports of the first and second call participants and transferring the mixed VoIP information to the third call participant.

DETAILED DESCRIPTION OF A PREFERRED EMBODIMENT

Figure 1:
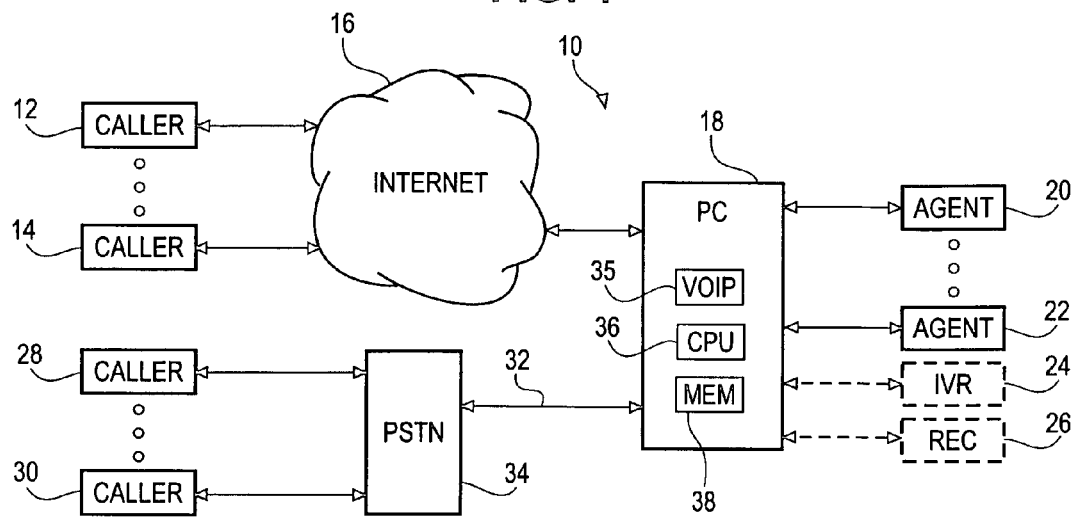
FIG. 1 is a block diagram of a system for providing a software based single agent multipoint conference capability in accordance with an illustrated embodiment of the invention.

FIG. 1 is a block diagram of a VoIP conferencing system 10, shown generally under an illustrated embodiment of the invention and in a context of use. As shown, a PC 18 (offering a conferencing functionality) may be connected between callers 12, 14 (participants) connected through the Internet 16 and a number of other participants (e.g., agents 20, 22, interactive voice response (IVR) unit 24 or an audio recorder 26). Participants may also include callers 28, 30 connected to a VoIP conference call at least partially through switched circuit connections established through the public switched telephone network 34.

Figure 2:
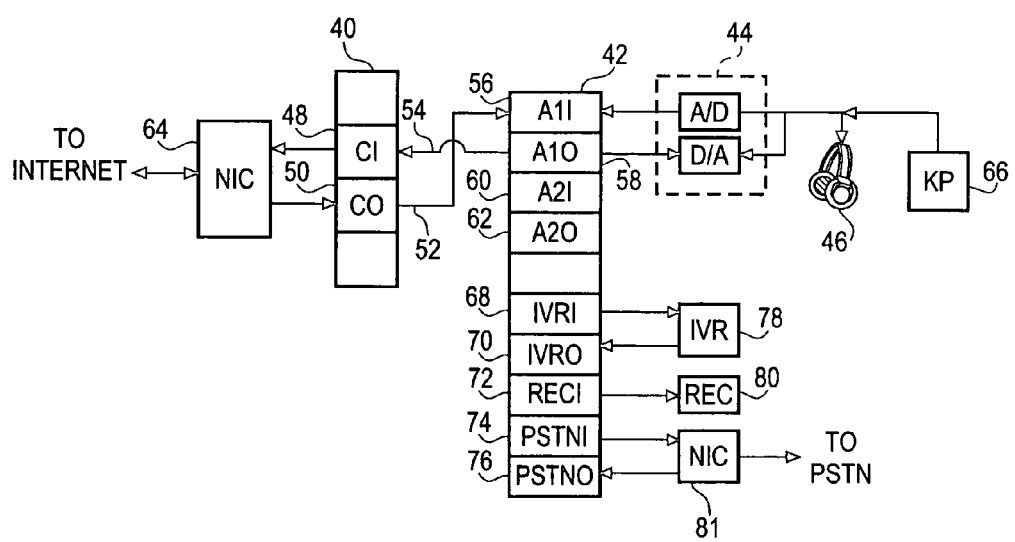
FIG. 2 is a block diagram showing details of the personal computer of FIG. 1.

FIG. 2 depicts structure within the PC 18 which may be used to process VoIP information between a caller 12, 14 and an agent 20, 22. For purposes of explanation, an Internet protocol stack (PS) 40 and enterprise PS 42 may be understood to delineate the boundaries of those VoIP processes which occur within the CPU 36 and those processes which occur outside the CPU 36. It should be understood that the PSs 40, 42 may be part of a single PS.

FIG. 2 shows a pair of network interface cards 44, 64 used to interface the CPU 36 with external devices. While NICs 44 and 64 are shown as separate devices, it should be understood that under certain conditions (e.g., the agent telephone 46 is a LAN phone) then NICs 44 and 64 may be substantially identical.

As shown, the Internet PS 40 includes a number of predetermined logical ports 48, 50 that may be used to provide a two-way connection with the caller 12, 14 through the Internet 16. One logical port 48 is provided for caller input (information from the agent 20, 22 to the caller 12, 14). A second logical port 50 is provided for caller output (information from the caller 12, 14 to the agent 20, 22).

The enterprise PS 42 within the PC 18 also provides a number of predetermined ports 56, 58, 60, 62 for interfacing agents 20, 22 with the VoIP processes occurring within the CPU 36. Other ports 68, 70 of the enterprise PS 42 may be used to interface an interactive voice response (IVR) unit 78 to a call. An output port 72 may be used to provide information to a recording device 80. A further set of ports 74, 76 may be used to interface conference calls from the PSTN 34.

In the case of the agents 20, 22, a first set of ports 56, 60 may allow the VoIP conferencing software 35 (hereinafter "the software" or "the VoIP software") to receive voice information from the agents 20, 22. A second set of ports 58, 62 may be used to transfer voice information from the VoIP process to the agents 20, 22.

To set up a call, an agent 20, 22 may enter an IP address of a called party 12, 14 through a keypad or keyboard 66. The software within the CPU 36 may accept the IP address and transmit a set-up request to the called party. The CPU 36 under control of the VoIP conference software may also begin setting up the VoIP structures of FIG. 2. To facilitate the flow of voice information, the CPU 36 may form a first connection 54 for outbound information (from the agent to the called party) and a second connection 52 for inbound information (voice information from the called party to the agent).

Turning first to the agent side of the VoIP connection, information exchanged with the agent 20, 22 through the NIC 44 may be exchanged under a pulse code modulation (PCM) format. The CPU 36, may cause the PCM information transceived through the NIC 44 to be reformatted into a real time protocol (RTP) format for use by the enterprise PS 42. Any appropriate RTP format (e.g., G.711, G.723, G.729, etc.) may be used.

Similarly, the CPU 36 may reformat the RTP information exchanged between the Internet PS 40 and the Internet 16. More specifically, the CPU 36 and NIC 64 may convert the RTP data of the protocol stack 40 into an appropriate communication protocol (e.g., H.323) used for communicating through the Internet 16.

Based upon the address entered through the key pad 66, the CPU 36 may exchange the VoIP voice information between the agent's enterprise ports 56, 58 and the Internet ports 48, 50. Based upon the transfers, the agent 20, 22 may converse with a called party 12, 14 using VoIP telephony.

Upon occasion, the first agent (A1) may choose to conference in a second agent (A2). To conference in the second agent A2, the CPU 36 forms a number of software mixers 82, 84, 86 (FIG. 3) for processing voice information. The mixers 82, 84, 86 may operate under a simple algorithm (e.g., (A+B)/2) intended to mix the PCM data of two callers (i.e., A and B).

Figure 3:
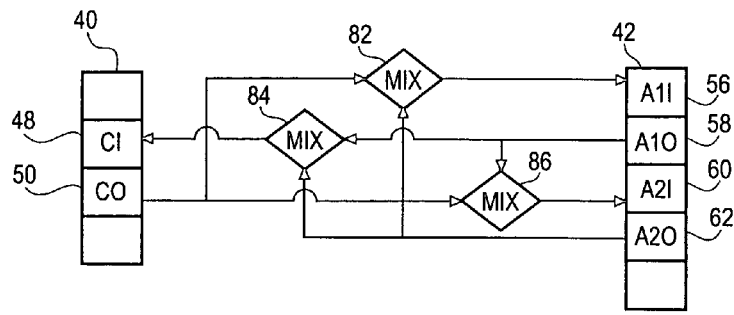
FIG. 3 is a block diagram showing further details of the personal computer of FIG. 1.

As shown in FIG. 3, incoming RTD data (i.e., caller output) received at a port 50 from a caller 12, 14 is mixed in a first mixer 82 with incoming RTP data (i.e., agent output) from an incoming port 62 of the second agent A2. The output of the mixer 82 is provided as output RTP data to incoming port 56 of the first agent A1.

Similarly, incoming RTP data received at port 50 from a caller 12, 14 is mixed in a second mixer 86 with incoming RTP data from incoming port 58 of the first agent A1. The output of the second mixer is provided as output RTP data to incoming port 60 of the second agent A2.

Finally, incoming RTP data received at a port 58 from a first agent A1 is mixed in a third mixer 84 with incoming RTP data from an output port 62 of the second agent A2. The output of the third mixer 84 is provided as output RTP data to incoming port 48 of the caller 12, 14.

Figure 4:
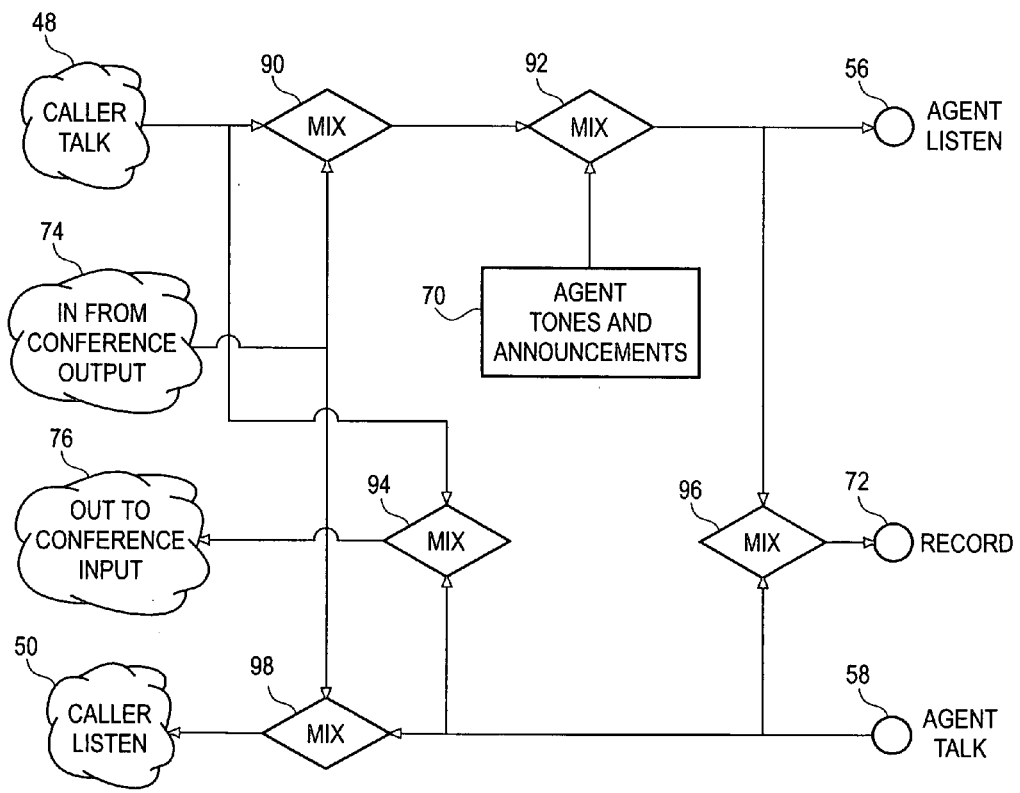
FIG. 4 depicts a generalized block diagram of the personal computer of FIG. 1.

FIG. 4 depicts another illustrated embodiment where conferencing may be extended to other resources. As shown in FIG. 4 mixing may be performed of voice information from any of a number of sources. For example, tones and announcements may be played from an IVR 78 that may be heard only by the agent.

For example, the CPU 36 may receive a message requesting set-up of a VoIP telephony connection from a caller 12, 14. Based upon the source IP address of the message, the CPU 36 may be able to retrieve information about the call originator 12, 14 from memory 38. Based upon the identity of the call originator 12, 14, the CPU 36 may select one or more messages from the IVR 78 to be played for the benefit of the agent 20, 22. Upon selecting the messages, the CPU 36 may activate message playback through the IVR 78 at the same time that the packet-based voice-path is set up through mixers 90, 92 and 98. Since the message is mixed in mixer 92 in the inbound voice path to the agent, the caller does not hear the message.

Alternatively, the agent 20, 22 may choose to record the call. Recording may be necessary in the case of threatening or harassing calls. To record the call, the agent 20, 22 may enter a RECORD instruction through a keypad 66. In response, the CPU 36 may activate a recorder 80. The CPU 36 may also activate mixer 96. The mixer 96 mixes agent outgoing voice information with caller incoming voice information. The combined voice information is sent to the recorder 80 and recorded.

In another illustrated embodiment, the agent may add a conference input to the call. The conference input may be derived from a set of PSTN ports 74, 76 connected to the PSTN 34 through a NIC 81. The agent 20, 22 may select a conference target by entry of a telephone number of a conference target 28, 30 through the keypad 66. The CPU 36 may outdial the entered telephone number of the conference target 28, 30. When the target 28, 30 answers, the CPU 36 may activate conference mixers 90, 94, 98 to conference in the conference target.

Incoming voice information from the conference target 28, 30 may be mixed with voice information from the caller 12, 14 in a first mixer 90 and transferred to the agent through an incoming agent port 56. Similarly, incoming voice information from the conference target 28, 30 may be mixed with voice information from the agent 20, 22 in a second mixer 98 and transferred to the caller 12, 14 through an outgoing caller port 50. Voice information of both the agent 20, 22 and caller 12, 14 may be mixed in a third mixer 94 and transferred to an outgoing port 76 of the conference target 28, 20.

A specific embodiment of a method and apparatus for creating VoIP conference calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of providing a three-party connection within a personal computer among a first call participant, a second call participant and a third call participants through a personal computer during a telephone call, such method comprising:
   providing a first port within a protocol stack of the personal computer for voice information of the first participant, a second port within the protocol stack the personal computer for voice information of the telephone call of the second participant and a third port within the protocol stack of the personal computer for voice information of the third call participant;
   receiving a connection instruction from the first participant through a keyboard of the first participant;
   forming a software mixer in response to the instruction;
   mixing the voice information from the ports of at least two of the group consisting of the first, the second and the third call participants within the formed software mixer of the personal computer; and
   transferring the mixed voice information from the personal computer to at least one of the group consisting of the first call participant working at the personal computer, the second participant and the third participant.

2. The method of providing a three-party connection as in claim 1 further comprising defining the telephone call as being a VoIP call and determining an identity of a call originator of the VoIP telephone call based upon a source IP address delivered to the personal computer along with the VoIP call.

3. A method of providing a three-party connection within a personal cornputer among a first call participant working at the personal computer through a local area network and second and third call participants during a voice-over-Internet-Protocol (VoIP) telephone call, such method comprising:
   determining an identify of a call originator of the VoIP telephone call based upon a source IP address delivered to the personal computer along with the VoIP call;
   providing a first port within the personal computer for voice information of the first participant, a second port within the personal computer for voice information of the VoIP telephone call of the second participant and a third port within the personal computer for voice information of the third call participant;

mixing the voice information from the ports of at least two of the group consisting of the first, the second and the third call participants within the personal computer; and transferring the mixed voice information from the personal computer to at least one of the group consisting of the first call participant working at the personal computer, the second participant and the third participant selecting a message to be played for the benefit of the first participant based upon the determined identity of the second participant where the selected message is heard only by the first participant and not by the second participant.

4. The method of providing a three-party connection as in claim 3 further comprising an interactive voice response unit playing the selected message unit through the third port.

5. The method of providing a three-party connection as in claim 1 further comprising coupling a recorder to the third port of the personal computer to record voice information received through the third port.

6. The method of providing a three-party connection as in claim 5 further comprising mixing VoIP information from the first and second participants.

7. The method of providing a three-party connection as in claim 6 further comprising recording the mixed information in the recorder coupled to the third port.

8. The method of providing a three-party connection as in claim 1 further comprising coupling the third participant to the personal computer through the local area network.

9. The method of providing a three-party connection as in claim 1 further comprising the first participant entering a telephone number of the third participant through a keypad of the personal computer.

10. The method of providing a three-party connection as in claim 9 further comprising the personal computer outdialing the entered telephone number.

11. The method of providing a three-party connection as in claim 10 further comprising the personal computer activating a set of conference mixers to conference in the third participant.

12. An apparatus for providing a three-party connection within a personal computer among a first call participant, a second call participant and a third call participants during a telephone call, such apparatus comprising:

means for providing a first port within a protocol stack of the personal computer for voice information of the first participant, a second port within the protocol stack of the personal computer for voice information of the telephone call of the second participant and a third port within the protocol stack of the personal computer for voice information of the third call participant;

means for receiving a connection instruction from the first participant through a keyboard of the first participant;

means for forming a software mixer in response to the instruction;

means for mixing the voice information from the ports of the protocol stack from at least two of the group consisting of the first, the second and the third call participants; and means for transferring the mixed information from the personal computer to at least one of the group consisting of the first call participant working at the personal computer, the second call participant and the third call participant.

13. The apparatus for providing a three-party connection as in claim 12 further comprising defining the telephone call as a VoIP telephone call and means for determining an identity of a call originator of the VoIP telephone call based upon a source IP address delivered to the personal computer along with the VoIP call.

14. An apparatus for providing a three-party connection within a personal computer among a first call participant working at the personal computer through a local area network and second and third call participants during a voice-over-Internet-Protocol (VoIP) telephone call, such apparatus comprising:

means for determining an identify of a call originator of the VoIP telephone call based upon a source IP address delivered to the personal computer along with the VoIP call;

means for providing a first port within the personal computer for voice information of the first participant, a second port within the personal computer for voice information of the VoIP telephone call of the second participant and a third port within the personal computer for voice information of the third call participants;

means for mixing the voice information from the ports of at least two of the group consisting of the first, the second and the third call participants;

means for transferring the mixed information from the personal computer to at least one of the group consisting of the first call participant working at the personal computer, the second call participant and the third call participant; and means for selecting a message to be played for the benefit of the first participant based upon the determined identity of the second participant where the selected message is heard only by the first participant and not by the second participant.

15. The apparatus for providing a three-party connection as in claim 14 further comprising means for playing the selected message by a interactive voice response unit as the third call participant through the third port.

16. The apparatus for providing a three-party connection as in claim 12 further comprising means for coupling a recorder to the third port of the personal computer for recording information.

17. The apparatus for providing a three-party connection as in claim 16 further comprising means for mixing voice information from the first and second participants.

18. The apparatus for providing a three-party connection as in claim 17 further comprising means for recording the mixed information in the recorder coupled to the third port.

19. The apparatus for providing a three-party connection as in claim 12 further comprising means for coupling the third participant to the personal computer through a local area network.

20. The apparatus for providing a three-party connection as in claim 19 further comprising means for entering a telephone number by the first participant of the third participant through a keypad of the personal computer.

21. The apparatus for providing a three-party connection as in claim 12 further comprising means within the personal computer for outdialing the entered telephone number.

22. The apparatus for providing a three-party connection as in claim 12 further comprising means within the personal computer for activating a set of conference mixers to conference in the third participant.

23. An apparatus for providing a three-party connection within a personal computer among a first call participant, a second participant and a third call participants during a telephone call, such apparatus comprising:

a first port within a protocol stack of the personal computer adapted to exchange voice information with the first participant working at the personal computer;

a second port within the rotocol stack of the computer terminal adapted to exchange voice information of the telephone call with the second call participant;

a third port within the protocol stack of the personal computer adapted to exchange voice information with the third participant;

a keyboard coupled to the personal computer through which the first participant may enter connection instruction;

a central processing unit within the personal computer that forms a software mixer in response to the entered connection instruction;

the software mixer adapted to mix the voice information from the ports of at least two of the group consisting of the first, the second and the third call participants; and a communication processor adapted to transfer the mixed voice information to at least one of the group consisting of the first, the second and the third call participant.

24. The apparatus for providing a three-party connection as in claim 23 further comprising defining the telephone call as being a VoIP telephone call and a central processing unit adapted to determine an identity of a call originator of the VoIP telephone call based upon a source IP address delivered to the personal computer along with the VoIP call.

25. An apparatus for providing a three-party connection within a personal computer among a first call participant working at the personal computer through a local area network and second and third call participants during a voice-over-Internet-Protocol (VoIP) tele hone call, such apparatus comprising:

a central processing unit adapted to determine an identity of a call originator of the VoIP telephone call based upon a source IP address delivered to the personal computer along with the VoIP call;

a first port within the personal computer adapted to exchange vQice information with the first participant working at the personal computer through the local area network;

a second port within the computer terminal adapted to exchange voice information of the VoIP telephone call with the second call participant;

a third port within the personal computer adapted to exchange voice information with the third participant;

a mixer adapted to mix the voice information from the ports of at least two of the group consisting of the first, the second and the third call participants; and a communication processor adapted to transfer the mixed voice information to at least one of the group consisting of the first, the second and the third call participant the central processing unit being further adapted to select a message to be played for the benefit of the first participant based upon the determined identity of the second participant where the selected message is heard only by the first participant and not by the second participant.

26. The apparatus for providing a three-party connection as in claim 23 further comprising an interactive voice response unit under control of the central processing unit adapted to play the selected message through the third port.

27. The apparatus for providing a three-party connection as in claim 23 further comprising a recorder coupled to the third port of the personal computer that records mixed voice information of the first and second participants.

28. The apparatus for providing a three-party connection as in claim 23 further comprising the third participant coupled to the personal computer through a local area network.

29. The apparatus for providing a three-party connection as in claim 23 further comprising a keypad coupled to the personal computer adapted to allow the first participant to enter a telephone number of the third participant through the keypad into a central processing unit of the personal computer.

30. The apparatus for providing a three-party connection as in claim 29 further comprising the central processing unit within the personal computer being further adapted to out-dial the entered telephone number.

31. The apparatus for providing a three-party connection as in claim 30 further comprising a set of conference mixers within the personal computer adapted to conference in the third participant.

* * * * *